United States Patent [19]
England

[11] 3,913,078
[45] Oct. 14, 1975

[54] PLATED WIRE MATRIX SWITCH FOR SWITCHING DIGITAL DATA

[75] Inventor: William A. England, Clearwater, Fla.

[73] Assignee: Honeywell Inc., Minneapolis, Minn.

[22] Filed: Jan. 6, 1971

[21] Appl. No.: 104,222

[52] U.S. Cl. .................. 340/174 PW; 340/174 PC; 340/174 DA; 340/174 TF

[51] Int. Cl.[2] ....................................... G11C 11/155

[58] Field of Search 340/174 PW, 174 TF, 174 TW, 340/174 PC, 174 QB, 174 DA

[56] References Cited

UNITED STATES PATENTS

| | | | |
|---|---|---|---|
| 3,083,353 | 3/1963 | Bobeck | 340/174 TW |
| 3,105,962 | 10/1963 | Bobeck | 340/174 TW |
| 3,408,635 | 10/1968 | Lee | 340/174 TW |
| 3,461,440 | 8/1969 | Chang | 340/174 TF |

*Primary Examiner*—Stanley M. Urynowicz, Jr.
*Attorney, Agent, or Firm*—Albin Medved

[57] ABSTRACT

An array of intersecting plated wires and conductive straps forming a matrix switch, the intersections functioning as open or closed digital data switches depending on whether the bit pattern stored at an intersection is unbalanced or balanced.

6 Claims, 2 Drawing Figures

INVENTOR.
WILLIAM A. ENGLAND
BY Charles J. Ungemach
ATTORNEY

PLATED WIRE MATRIX SWITCH FOR SWITCHING DIGITAL DATA

SUMMARY

The invention pertains to a solid state electronic matrix switch for transferring digital data from a selected one of a group of input lines to a selected one (or more) of a group of output lines. Mechanical and electromechanical switches of the same general type are sometimes referred to as cross-bar switches. The matrix switch is based on the technology associated with plated wire magnetic memories and utilizes an intersecting array of round plated wires (sometimes called bit lines or digit lines) and flat conductive straps (sometimes called word straps). The matrix switch includes write and read functions which are the same as those employed in plated wire magnetic memories. Each input line is associated with a set of word straps and each output line is associated with a set of plated wires. The transfer of digital data from a selected input line and its associated set of word straps to a selected set of plated wires and its associated output line depends upon the pattern of the bits written and stored in the plated wires at the associated intersection. An unbalanced bit pattern allows the transfer to occur because the digital data present on the selected set of word straps induces signals in the plated wires which are aiding whereas with a balanced pattern the induced signals are opposing.

The matrix switch has many advantages mainly because it uses plated wire and therefore is nonvolatile, fast, highly reliable, uses low switching power, uses no standby power, is radiation hard, small, light, and shock resistant. Output isolation is good, that is, there are no sneak paths.

An obvious use of the matrix switch is in teletypewriter or digital computer switching exchanges. The matrix switch is not limited to switching and for example can be used as a coder to scramble words in cryptographic applications; a computer code converter, for example, converting binary to decimal; a scanner; or a multiplexer.

Figure 1:
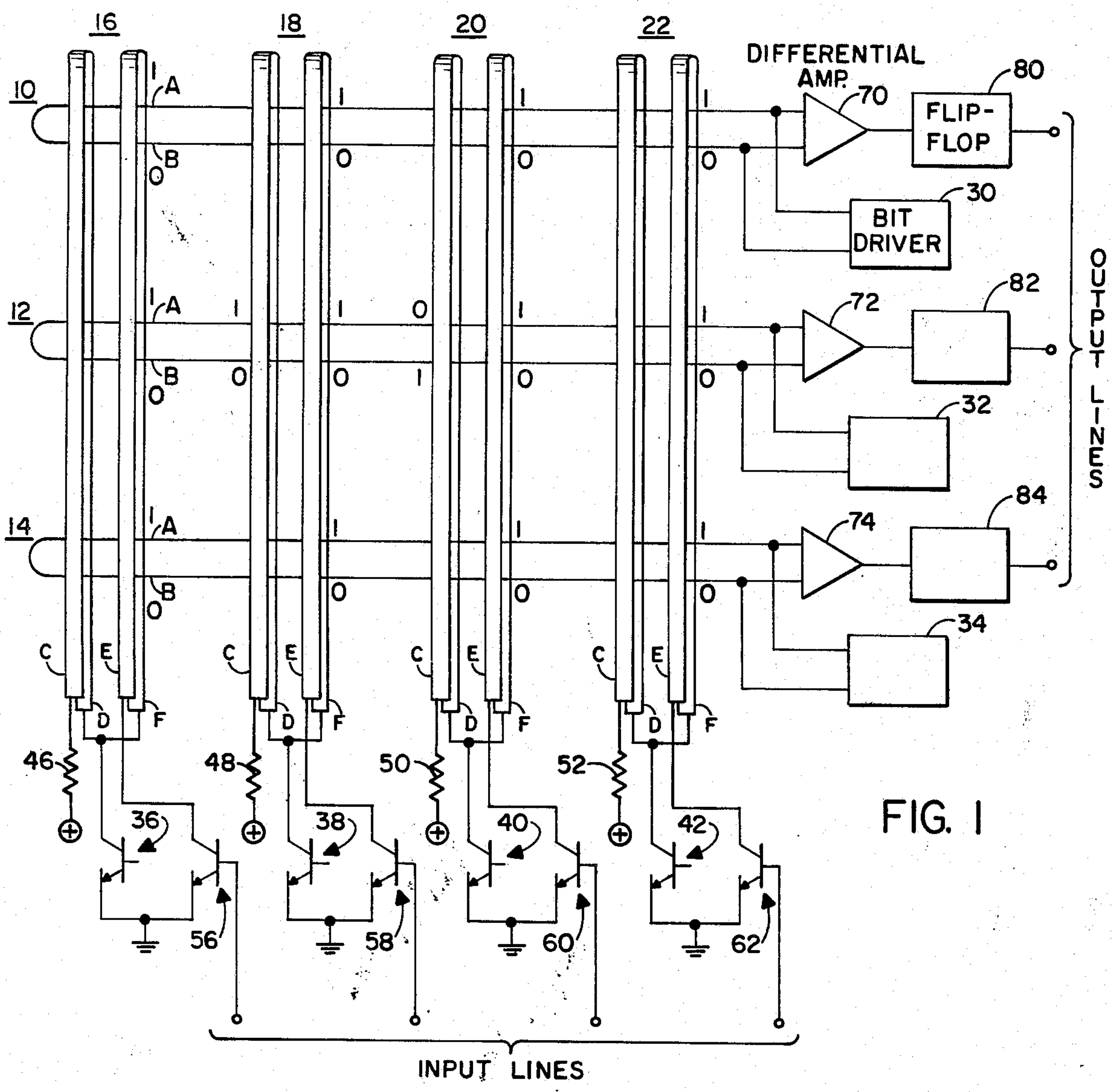
Figure 2:
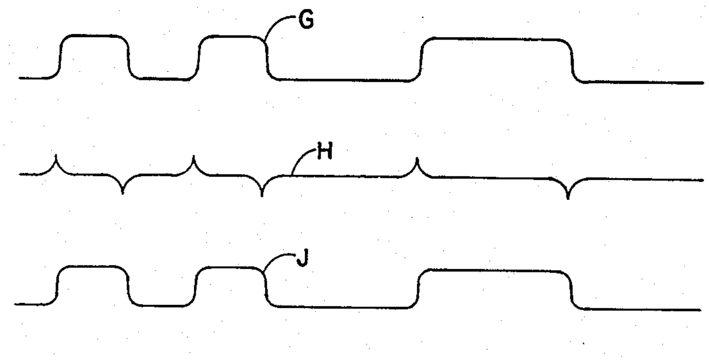

The drawings consist of FIGS. 1 and 2. FIG. 1 is a functional block diagram of a plated wire matrix switch and FIG. 2 comprises a set of waveforms which are useful in explaining the operation of the matrix switch.

DESCRIPTION

The theory and operation of plated wire memories, which forms the background of the present invention, is well-known. A recent reference is: Fedde G. A. "Plated Wire Magnetic Film Memories" *Electronics World*, October 1970, pages 53–55.

Plated wire is a conductive wire on which a film of magnetic material, usually a nickel-iron alloy has been deposited. During the manufacturing process the film is magnetized in the circumferential direction, also called the easy direction. The longitudinal direction, perpendicular to the circumferential direction, is called the hard direction. The internal magnetic field in the film tends to align itself in the easy direction in the absence of an external field having a component in the hard direction. An external magnetic field in the hard direction will rotate the field in the film from the easy direction toward the hard direction but when the external field is removed the field in the film rotates back to the easy direction. Rotation of the field in the film causes currents to be induced in the conductive portion of the plated wire. This results in a non-destructive read-out (NDRO) memory device.

Writing, that is, storing a magnetic field in a plated wire memory element, requires coincident current pulses in the bit line and word strap. The word strap current produces a strong field compared to that produced by the bit line current. The bit line current produces a field which steers the field produced by the word strap current. Steering provides a field within the film which when the word strap and bit line currents are removed rotates to the easy direction. Whether the easy direction is clockwise or counter-clockwise is determined by the direction of the bit line current. A plated wire memory element can have one of two possible logical states, 0 or 1, depending upon whether the circumferential field is aligned in a clockwise or a counter-clockwise direction.

In reading, that is, sensing the direction of the stored field, a current pulse is passed through the word strap and the resulting current induced in the plated wire is sensed. The induced current will take on one of two opposite waveforms depending on whether the stored field is clockwise or counter-clockwise in the easy direction.

The plated wire matrix switch of FIG. 1 comprises plated wire sets 10, 12 and 14 and strap sets 16, 18, 20, and 22. Each plated wire set includes two wires A and B and each strap set includes four straps C, D, E and F. Each strap set is arranged in two over-and-under loops, straps C and D forming one loop and straps E and F the other. In the manufacturing process a single centertapped double loop, rather than two interconnected single loops, may be used. Plated wires A and B in each set are effectively joined at their left ends. Wires A and B may be physically distinct and actually connected together or they may be formed from a single wire which has been bent in the middle to form a plated wire with two parallel portions. Connected across the right ends of the plated wires of sets 10, 12 and 14 are bit drivers 30, 32 and 34 respectively. The bit drivers generate current pulses of positive or negative polarity as selected. The lower end of each strap C in the sets 16, 18, 20 and 22 is connected to a source of voltage V+ by resistors 46, 48, 50 and 52 respectively. The function of the resistors is to limit the current flow in the word strap. Straps D and F in each set 16, 18, 20 and 22 are connected together and connected to the collectors of NPN transistors 36, 38, 40 and 42 respectively, the emitters of which are connected to a circuit reference point (ground). These transistors function as switches. Forward biasing the base-emitter junction of a transistor grounds the lower end of strap D associated with the transistor and establishes a path for current to flow from source V+ through the straps C and D associated with the transistor. The lower end of the straps E in each set 16, 18, 20 and 22 are connected to the collectors of NPN transistors 56, 58, 60 and 62 respectively, the emitters of which are connected to ground. These transistors also function as switches. Forward biasing the base-emitter junction of a transistor grounds the lower end of the strap E associated with the transistor and establishes a path for current to flow from source V+ through the strap set associated with the transistor.

Also connected across the right ends of the plated wires of sets 10, 12 and 14 are differential amplifiers 70, 72, and 74 respectively which function to amplify the current signals induced in the plated wires. The output of amplifiers 70, 72 and 74 is used to trigger flip-flops 80, 82 and 84 respectively. The purpose of the flip-flops is to reconstruct the original form of the input data, which is usually in the form of square pulses.

In explaining the operation of the switch it is assumed that the entire matrix switch is in a connected condition where the input and output lines are interconnected. The input lines are connected to the bases of transistors 56, 58, 60 and 62 and the output lines are connected to the outputs of flip-flops 80, 82 and 84. This is a 4 by 3 matrix switch. To first put the matrix switch in a connected condition the base-emitter junctions of transistors 56, 58, 60 and 62 are momentarily forward biased which completes the paths for current to flow from source V+ through the straps of each set 16, 18, 20 and 22. At the same time bit drivers 30, 32 and 34 are turned on such that current flows to the right in wire A in each set 10, 12 and 14 and to the left in wire B. (All current directions are arbitrarily assumed.) This causes an unbalanced pattern of bits to be formed at each intersection. The unbalanced pattern is shown at the intersection of wire set 12 and strap set 18. In this unbalanced pattern, e.g., there are two 1's on wire A and two 0's on wire B at the intersection. If an eight-strap rather than a four-strap embodiment was used then there would be four 0's on one wire and four 1's on the other wire. In general an unbalanced pattern has all 0's on one wire and all 1's on the other wire at an intersection and the number of 1's is equal to the number of 0's. Each intersection of the matrix switch is in a connected condition so that data applied to the input lines will be transferred to the output lines.

Now to place the entire switch in the non-connected condition the base-emitter junctions of transistors 36, 38, 40 and 42 are forward biased momentarily while the bit drivers 30, 32, and 34 are turned on such that current flows in the direction opposite to that in the conducting condition, that is, left in wire A in each set 10, 12 and 14 and right in wire B. This causes a balanced pattern to be written in all locations. This balanced pattern is shown at the intersection of wire set 12 and strap set 20. In the balanced pattern each wire at an intersection has an equal number of 1's and 0's. Note that with respect to the intersection of the right hand word strap in a set with a pair of wires the pattern of 1's and 0's shown may be recorded at the time of manufacture, eliminating the need for writing the unbalanced pattern. In this condition digital data applied to the input lines is not transferred to the output lines. Data in the form of trains of positive pulses may be present on each input line. The positive pulses forward-bias transistors 56, 58, 60 and 62 which complete paths for current to flow in the strap sets. Currents in the strap sets induce currents in the plated wires but with balanced bit patterns the induced currents in each wire A and B at each intersection are of the opposite sense and cancel or buck each other out. In this case amplifiers 70, 72 and 74 sense nothing.

Assume next that it is desired to transfer data present on the input line associated with the base of transistor 58 to the output line associated with flip-flop 82. The base-emitter junction of transistor 38 is forwardbiased, providing a path for current to flow in straps C and D of set 18 and bit driver 32 is turned on such that current flows to the right in wire A of set 12 and to the left in wire B, the opposite of that when a nonconnected condition is wanted. The previous balanced pattern present at the intersection of wire set 12 and strap set 18 is now changed to an unbalanced pattern. The two left hand bits are changed so that there are now two 1's on line A at this intersection and two 0's on line B. Now when data pulses are applied to transistor 58 and current flows in strap set 18, the induced currents in wires 12A are aiding, the induced currents in wire 12B are aiding, and the resulting currents in wires 12A and 12B are aiding. Differential amplifier 72 senses the induced current signals and amplifies the signals after which they are used to trigger flip-flop 82. In FIG. 2 waveform G corresponds to the input data present, for example, at the base of transistor 58, waveform H corresponds to the signal developed across wires 12A and 12B, and waveform J corresponds to the output data present at the output of flip-flop 82. To change a connected intersection to a nonconnected intersection the current in straps 18C and D is turned on again and the current in wires 12A and B is again reversed.

Many obvious modifications will occur to those skilled in the art and therefore the invention is not to be limited to the specific embodiment shown and described. The invention is to be limited only by the following claims.

I claim:

1. A matrix switch comprising in combination:
- a plurality of sets of NDRO elements comprising wires completely plated with a magnetic material;
- a plurality of sets of conductive straps, orthogonal to the wires and the magnetic plating and wrapped around the sets of plated wires;
- means for selectively writing balanced and unbalanced patterns of bits at the intersections of selected sets of wires and straps;
- means for connection to a plurality of sources of data pulses;
- means responsive to data pulses for injecting current pulses corresponding to the data pulses into the straps;
- means for amplifying signals induced in the plated wires corresponding to data pulses; and,
- means responsive to the amplifying means for reconstructing the amplified induced signals.

2. The apparatus of claim 1 wherein a set of straps comprises four straps arranged in over-and-under loops.

3. The apparatus of claim 2 wherein a set of plated wires comprises two plated wires joined at one end.

4. The apparatus of claim 2 wherein a set of plated wires comprises a single wire bent in the middle so as to form two parallel portions of plated wire.

5. The apparatus of claim 1 wherein a balanced pattern is defined as one wherein bits of both orientations occur on each plated wire of a set and an unbalanced pattern is defined as one wherein bits of only one orientation occur on each plated wire of a set.

6. The method of using a matrix of plated wires and orthogonal straps to selectively direct the passage of data wherein data present on a selected plurality of straps is additively induced in a selected plurality of wires, comprising the steps of:
- storing an unbalanced pattern of bits at the intersections of the selected plurality of wires and straps where additive induction of data present on the straps is desired; and,
- storing a balanced pattern of bits at the intersections of the unselected plurality of wires and straps where additive induction of data present on the straps is not desired.

* * * * *